April 11, 1961   K. E. HUMBERT, JR   2,979,208
FLUID LINE SUPPORTED FILTER AND FILTER MOUNTING
Filed Dec. 17, 1956
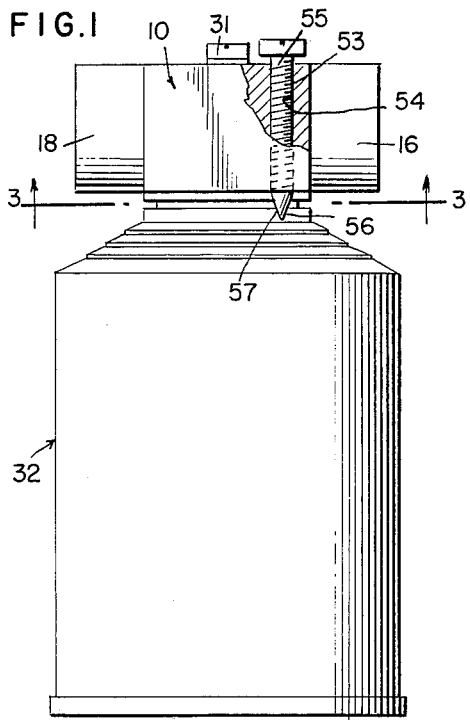
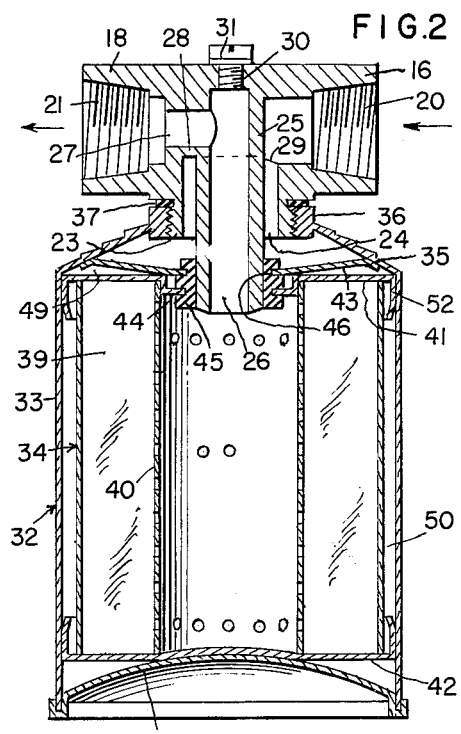
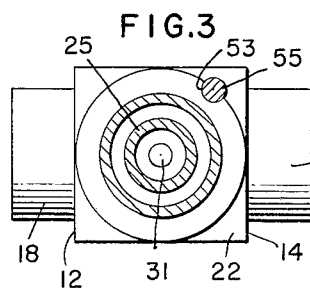
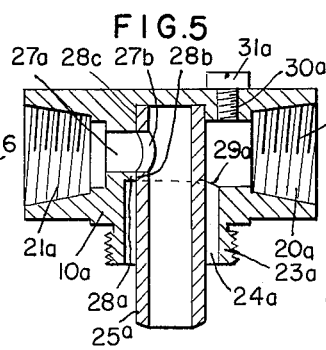
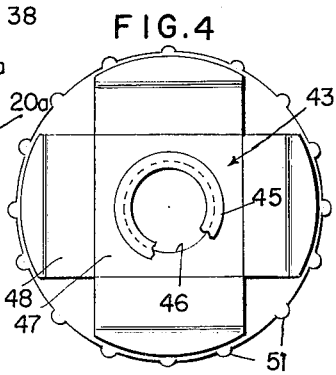
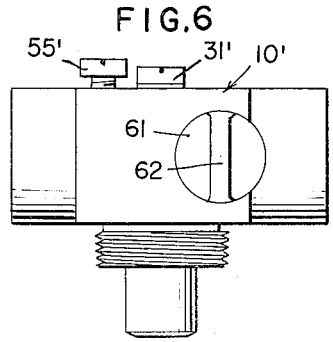
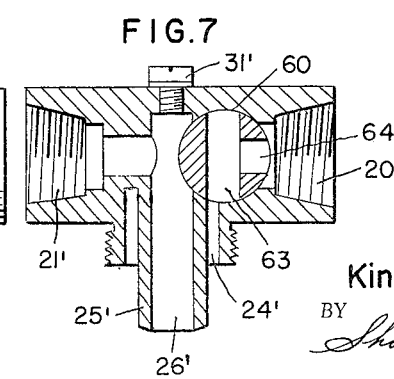
INVENTOR.
Kingsley E. Humbert, Jr.
BY Shoemaker & Mattare
ATTYS United States Patent Office 2,979,208
Patented Apr. 11, 1961

2,979,208

FLUID LINE SUPPORTED FILTER AND FILTER MOUNTING

Kingsley E. Humbert, Jr., Gastonia, N.C., assignor to Wix Corporation, Gastonia, N.C., a corporation of North Carolina Filed Dec. 17, 1956, Ser. No. 628,690

11 Claims. (Cl. 210—232)

This invention relates generally to filters and supports for the same and is directed particularly to a filter and mounting for use in association with oil systems in homes and commercial establishments where such oil systems are associated with heating equipment and for use in connection with diesel engines or other oil consuming equipment.

In oil heating systems for private homes and business establishments, it is desirable that an efficient filtering means be used for effectively removing any particles from the oil before the same reaches the burner nozzle, and the present invention is designed to be easily connected in the oil line leading to the burner nozzle. However, in such systems there is always the possibility of persons tampering with the filter and accordingly the filter support forming a part of the present invention is designed so that the filter when placed thereon can be locked or at least secured in such a way that its detachment from the support cannot be easily accomplished.

In diesel engine systems such as are used in trucks and other apparatus where there is a certain amount of motion, the filter is subjected to vibration which would tend to loosen it from its support if it is not firmly secured or locked in place and the present invention is also designed particularly for use in such systems.

In view of the foregoing, a particular object of the present invention is to provide a combined filter and supporting means therefor wherein the supporting means is in the form of a coupling union for connection into an oil line and having a means by which a screw neck type filter can be mounted thereon with a fluid passage leading from an inlet port through the filter mounting to pass the fluid into the filter and another passage communicating with an outlet port whereby the fluid can be returned from the filter for transmission to the point of consumption.

Another object of the invention is to provide a coupling and a filter unit mounting of the character stated, with means carried by such coupling for securing or locking a filter in place thereon.

A still further object of the invention is to provide a new and novel combination of coupling device designed to provide a mounting for a screw neck type filter and a filter structure designed so that when it is attached to the coupling, a fluid-tight connection will be automatically established between the filter element forming a part of the filter unit, and a part of the coupling mounting.

Another object of the invention is to provide a novel pipe line coupling which is designed as above set forth to furnish a support for a filter unit, wherein the coupling may be cast as a single unit or may be made up of two separate parts readily fitted together to form the complete unit.

Still another object of the present invention is to provide a new and novel combination of coupling device designed to provide a mounting for a screw neck type filter and a filter structure designed so that when it is attached to the coupling a fluid tight connection will be automatically established between the filter element forming a part of the filter unit and a part of the coupling mounting and wherein a means is provided in the mounting which will facilitate by-passing the filter element in the event that the element or a part of the mounting leading thereinto becomes clogged.

The invention will be best understood from a consideration of the following detail description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

In the drawing:

Fig. 1 is a view in side elevation of the combined filter mounting coupling and filter unit, showing the means carried by the mounting for securing or locking the filter unit in position thereon;

Fig. 2 is a vertical longitudinal section through the structure shown in Fig. 1, the plane of section being at right angles to the direction of viewing the structure of Fig. 1;

Fig. 3 is a horizontal section taken substantially on the line 3—3 of Fig. 1;

Fig. 4 is a plan view of the inner end of the filter element removed from its casing;

Fig. 5 is a sectional view through a modified form of the mounting and coupling unit;

Fig. 6 is a view in side elevation of the mounting coupling modified by having a rotary plug valve combined therewith for by-passing an attached filter;

Fig. 7 is a longitudinal section through the modification of the mounting shown in Fig. 6 and showing the by-pass valve therein in section and in closed position.

Referring now more particularly to the drawing, the filter mounting unit which, as hereinbefore stated, also functions as a coupling to be connected in a fluid line between two pipe ends, in the embodiment illustrated in Figs. 1, 2 and 3, is formed as a one piece structure of substantially T-shape, as viewed in side elevation by casting or in any other suitable manner. This structure comprises the middle body portion 10 which is here shown as being of substantially cubical form and for convenience of describing the parts thereof the different faces or sides of such form will be particularly referred to although it will be readily recognized that the device could be cast, molded or otherwise fabricated, to have the body 10 circular or of any other external shape.

The body 10, as illustrated, has extending from opposite sides 12 and 14 the arms 16 and 18 respectively which form coupling nipples whereby the structure may be connected in a pipe line between opposing ends of two pipe sections, not shown, and such nipples are accordingly internally threaded as indicated at 20 and 21 to provide respectively intake and outlet ports. The numeral 22 designates the under side of the body 10 and this side has formed integral therewith the threaded collar extension 23.

The collar 23 defines an annular passage 24 and extending through this annular passsage and, in the form shown in Figs. 1, 2 and 3, cast integral with the body 10 is a fluid outlet tube 25, the inner end of which joins the body 10 at the opposite side from the collar 23. This tube 25 is of such length as to have the outer end extended a substantial distance out of and beyond the threaded collar 23, as illustrated, and the passage 26 through the tube communicates at the inner end of the tube with the angularly directed outflow passage 27 which leads to the outlet port 21.

The passage 27 and the passage 26 through the tube 25 are sealed off from the passage 24 by the wall portion 28 which on the side of the tube 25 nearest to the inlet port 21 is apertured or cut away to form an opening 29 leading from the inlet port 20 into the annular passage 24.

At the inner end of the tube 25 the body 10 has a threaded opening 30 which is closed by a screw plug 31. This opening 30 provides a means for venting air from the filter and the pipe line or system in which the fitting and filter are connected.

The filter unit here shown attached to the mounting coupling is generally designated 32 and comprises the receptacle or can 33 and a filter element in the can which is generally designated 34. This unit is suspended in use to hang from the mounting coupling and while this is the invented position of use, it will be recognized that the fitting may be reversed to have the filter stand upright thereon, if desired.

The can or filter element container 32 may be of any desired form but is preferably a drawn metal or extruded receptacle having the tapered inner end wall 35 joined to an integral internally threaded collar 36 which is designed to be threaded onto the collar 23 of the mounting coupling and when so threaded thereon a suitable gasket 37 is interposed between the outer end of the collar 36 and the adjacent wall 22 of the body 10.

The outer end of the shell or housing for the filter element 34 is closed by the applied inwardly bowed wall 38 which by reason of the inward curve or bow thereof bears against the adjacent end of the filter element, as illustrated.

The filter element 34 is made up of an annular fluted body of filter material having a central passage therethrough, the filter material being generally designated 39, and the passage through the annular fluted body is reinforced by an apertured metal sleeve 40. This fluted body of material is of the same design as that shown in application Serial No. 478,359 now U.S. Patent No. 2,937,756, granted May 24, 1960.

The overall diameter of the fluted filter element is materially less than the inside diameter of the can or receptacle in which it is housed and secured to the inner and outer ends of the body 39 are the plates 41 and 42 which have an overall diameter approximately equal to the inside diameter of the housing 33 so that they center the fluted filter element therein. The outer end plate 42 has the housing end wall 38 pressed thereagainst and the inner end plate 41 carries a resilient spacer member which is generally designated 43, which bears against the inner side of the tapered end wall 35.

The plate 41 has a central circular offset flange 44 which defines a central opening in which is fitted a gasket ring 45, the edge of the flange being embedded in the gasket ring as illustrated. This flange extends into the inner end of the perforated reinforcing tube 40 and fits tightly therein.

The spacer 43 is also secured to the end of the filter member by means of the gasket 45, as shown, this attachment or securing between the gasket and the spacer being effected by having the edge of the central opening 46 which is formed in the central part of the spacer, embedded in the material of the gasket as shown.

The spacer 43 is preferably formed from a relatively thin sheet of metal of resilient character and comprises the central part 47 and the outwardly extending resilient arms 48 which are all offset with respect to the same side of the central part 47 to extend obliquely with respect to such side and the opposite side of the central portion 47 bears against the inner end plate 41 so that the outer ends of the arms 48 are spaced from the plate 41. When the filter element is placed in position in the can 33 through the outer end thereof, the ends of the spacer arms 48 will come to rest against the tapered inner end wall 35 and when the outer end wall 38 is applied and secured in leak-proof connection with the outer end of the can 33, it will press the filter element inwardly so as to impose considerable pressure against the resilient arms 48 of the spacer and thus filter element will be firmly maintained in position in the can.

No detailed illustration or description is given of the fluted filter element or the end plates 41 and 42 and reinforcing apertured tube 40, as these parts are illustrated and described in prior applications.

The gasket 45 forms a coupling between the inner end plate 41 and the spacer 43 and the inside diameter of the gasket is such as to receive and form a fluid-tight connection with the outer or extended end portion of the tube 25 when the filter unit is threadably connected with the collar 23. Accordingly it will be seen that when the filter unit is mounted in position upon the mounting coupling, the port 20 will be in communication with the passage 24 so that fluid entering the port 20 will flow into the space 49 between the plate 21 and the wall 35 and will then pass across the perimeter of the plate 41 into the space 50 between the fluted filter element and the wall of the can 33 to flow radially inwardly into the tube 40 from which it will pass outwardly through the tube 25 of the mounting coupling to leave by way of the port 21.

The passage of the fluid from the space 49 into the space 50 across the perimeter of the plate 41 is permitted by the provision of out-pressed ribs 51 in the perimeter flange 52 of the plate 41, thereby providing spaces between the ribs for such passage of the fluid.

For effecting the locking or securing of the filter unit upon the mounting coupling, the body portion 10 is provided with a passage 53 therethrough, parallel to and outside of the major diameter of the collar 23, the passage opening through the wall 22 from which the collar 23 projects.

This passage 53, or at least a portion thereof, is screw threaded as indicated at 54 and there is extended through the passage 43 from the top side of the body 10 the locking screw 55 which has the tapered or pointed end portion 56 which is designed to project beyond the wall 22 of the body and to bear against and cut into the side or edge of the filter unit collar 36, as indicated at 57. Thus when the screw is threaded inwardly and the tapered point 56 is forced against and into the material of the collar 36, which is relatively soft as the can would be formed of aluminum or an alloy thereof, the filter unit will be tightly secured so that it cannot become unthreaded from the mounting coupling collar 23.

The mounting coupling thus far described has been illustrated as cast or otherwise formed as a single unit but it is also contemplated to form this part of the invention in two portions, as illustrated in Fig. 5. In this modified form shown in Fig. 5, the body portion 10ª is formed with the opposite inlet and outlet ports 20ª and 21ª and extending at right angles to these ports which are aligned as in the first embodiment, is the outwardly projecting externally threaded mounting collar 23ª. The passage 24ª through the collar is closed at its inner end through the major portion of its circumference by the wall 28ª which has a central opening 28ᵇ therethrough which defines a bore 28ᶜ of slightly reduced diameter and this bore has tightly fitted therein the inner end portion of the separately formed tube 25ª which corresponds to the integral tube 25 of the first embodiment. The body 10ª has formed therein from the port 21ª the passage 27ª which opens into the bore 28ᶜ and the inner end portion of the tube 25ª has an opening 27ᵇ which communicates with the passage 27ª to complete the outflow passageway leading from the filter to the port 21ª.

At the opposite side of the passage 27ª of the body, the wall 28ª has an opening 29ª therein corresponding to the previously referred to opening 29, which communicates with the port 20ª.

In this modified construction the vent port 30ª is formed at one side of the tube 25ª instead of on the axial center thereof as in the first described structure, this port being closed by the screw plug 31ª as shown.

While it has not been illustrated in Fig. 5, it will be understood that this modified construction also carries the locking screw 55 threaded through the body 10ª in the same manner as the screw 55 is shown in Figs. 1 and 3.

Figs. 6 and 7 illustrate a further embodiment wherein is provided a means for by-passing the filter in the event that the latter becomes clogged for any reason.

In this modified construction the form of the mounting shown in Figs. 1 and 2 has been illustrated wherein the outlet tube which is here designated 25' is integral with the cast body 10'.

The numerals 20' and 21' designate respectively the inlet and outlet ports and numeral 31' designates the removable screw plug whereby the system can be vented of air if and when desired.

The other parts of this mounting are the same as the mounting shown in Fig. 2 and accordingly it is not believed that detailed reference to these other parts is necessary. It will be understood, of course, that in the modification shown in Figs. 6 and 7 a locking screw such as the one shown in Fig. 1 and designated 31 forms a part of the mounting and which screw is here designated 55'.

The mounting 10' has formed transversely through the body at the side of the tube 25' adjacent to the inlet port 20', a rotary plug bore which is designated 60. Rotatably supported in the bore 60 is a rotary plug which is generally designated 61 and which on one end, as shown in Fig. 6, is provided with a suitable key or head 62 to facilitate grasping for rotating the valve to turn it to opened or closed position.

As shown in Fig. 7, the valve plug is a three-way type, having the diametrical bore 63 and the radial bore 64 which opens through the side of the plug at one end and at the other end opens into the diametrical bore 63. When the plug is in the position in which it will be maintained when the system is in use and the filter is functioning properly, the radial bore 64 will be directed outwardly toward the port 20' and the diametrical bore will be disposed to have one end in communication with the passage 24' which leads into the filter. In the event that the filter becomes clogged and in order not to interrupt the flow of fluid in the system in which the mounting is connected, the plug 61 may be rotated in the counter-clockwise direction as it is viewed in Fig. 7 so as to align the bore or passage 63 with the ports 20' and 21' and effect the closing of the outer end of the radial bore 64. Since the bore 60 for the plug 61 intersects the bore 26' of the tube 25', it will be seen that when the valve is turned to the filter-shunt or by-pass position, the flow between the ports 20' and 21' will be uninterrupted.

The shunt valve 61 has been shown, as previously stated, in association with the mounting which is cast all in one piece, but it is to be understood that this valve may also be provided in a mounting of two-part construction such as that shown in Fig. 5, if desired.

From the foregoing description it will be seen that there is provided by the present invention a novel filter mounting and coupling unit and a novel filter structure for use in association therewith, and there is also provided a novel means of locking the filtering unit upon such mounting so that its removal, either by persons tampering with the filter, or by vibration, cannot be easily effected.

I claim:

1. A mounting for a filter unit of a type which comprises a shell having a filtering body permanently sealed therein and wherein the shell has one end wall provided with an opening defined by a threaded collar and the filter body within the shell having an end carrying a gasket spaced from and coaxial with the collar and the gasket being smaller in inside diameter than the collar; said mounting comprising a substantially T shaped structure embodying oppositely extending tubular arms adapted to be coupled with a pair of pipe ends in a fluid line and a threaded extension intermediate the arms and directed substantially at right angles to the arms, the threaded extension forming a screw threaded collar adapted to be threadably connected with the said threaded collar of the filter unit shell, a tube body having a bore therethrough and being of smaller outside diameter than the inside diameter of the threaded collar extension for insertion into the said filter body gasket, the inner end of the tube body having the bore thereof extending across and terminating between the tubular arms and the bore being in communication with one of said tubular arms, and said tube body being spaced from the surrounding portion of the threaded collar extension forming a fluid passage space and said fluid passage space having communication with the other one of said tubular arms.

2. The invention according to claim 1 with a locking screw threaded through the structure parallel with the axis of the filter unit shell and at a location on the body structure relative to the filter unit shell collar whereby the screw when threaded in one direction will form and engage in a locking recess across the threaded collar of the shell and lock the filter unit against unthreading movement relative to the threaded extension of the mounting structure.

3. The invention according to claim 1 with a locking screw threaded through the structure parallel with the axis of the filter unit shell and having a tapered end portion extending in a direction for frictional engagement in the tapered portion thereof with the threaded collar of a filter unit shell coupled with the said threaded extension of the mounting, said tapered end of the screw being adapted to be forcibly thrust across and in engagement with the side of the threaded collar of the filter unit shell to form a locking recess therein whereby the shell will be held against unthreading movement relative to the threaded extension of the mounting.

4. The invention according to claim 1 wherein the said T shaped structure has a drainage and venting opening in the side thereof remote from the threaded extension and between and opening into one of said tubular arms, and removable means for closing the drainage and venting opening.

5. The invention according to claim 1 wherein the said T shaped structure and the said tube body are all formed in one piece.

6. The invention according to claim 1 wherein the tube body constitutes a separate unit from the T shaped structure and has the said inner end thereof extending across the tubular arms and fixed in a bore formed in the T shaped structure at the side of the tubular arms remote from the threaded extension.

7. The invention according to claim 1 with adjustable means carried by the T shaped structure between the arms and at one side of the tube body for shunting out the said fluid passage and passing fluid directly through the structure from one arm to the other.

8. The invention according to claim 7 wherein the said adjustable means comprises a three-way valve plug rotatably supported transversely of the axis of the tubular arms with means located externally of the structure for rotating the plug.

9. As a new combination, a filter unit comprising a cylinder shell having inner and outer end walls, the inner end wall having an opening defined by a threaded mounting collar, an elongate filter body in the shell of smaller external transverse dimensions than the interior of the shell and having a central longitudinal passage therethrough, the filter body being positioned centrally in the shell and having one end spaced from said inner end wall, said passage being closed at the outer end of the body, an annular gasket secured in the inner end of the passage coaxial with and spaced from said mounting collar, and a mounting unit comprising a substantially T shaped structure embodying oppositely extending tubular arms adapted to be coupled with a pair of pipe ends in a fluid line and a threaded extension intermediate the arms and directed substantially at right angles to the axis of the arms, the threaded extension forming a screw threaded collar adapted to have said threaded mounting collar of the filter unit shell coupled therewith, a tubular body having a bore therethrough and being of smaller outside diameter than the inside diameter of the threaded collar extension, the tube body extending through and projecting at one end a substantial distance from the inner end of the threaded collar extension and frictionally engaging at said one end in said filter body gasket, the inner end of the tube body extending across the axis of the tubular arms and having a lateral opening communicating the bore with one only of said tubular arms, and said tube body being spaced from the surrounding portion of the threaded collar extension and forming therewith a fluid passage space and said fluid passage space having communication with the other one only of said tubular arms.

10. The invention according to claim 9, with a resilient spacer between the inner end of the filter body and the adjacent inner end wall of the shell and maintaining the outer end of the filter body firmly positioned against the shell outer wall.

11. The invention according to claim 9 with a spacer interposed between the inner end of the filter body and the shell inner end wall, said spacer comprising a central plate portion having a central opening and a number of outwardly extending angled arms, the said gasket having a portion extending through and fixed in said plate opening whereby the spacer is fixedly secured by the gasket to the filter body and said arms being resilient and bearing at their outer ends against the shell inner end wall.

References Cited in the file of this patent

UNITED STATES PATENTS

| | | |
|---|---|---|
| 846,704 | Stucy | Mar. 12, 1907 |
| 1,705,042 | Babitch | Mar. 12, 1929 |
| 1,940,316 | McKinley | Dec. 19, 1933 |
| 2,284,787 | Winkler | June 2, 1942 |
| 2,586,508 | Brotman | Feb. 19, 1952 |
| 2,731,152 | Redner | Jan. 17, 1956 |
| 2,758,719 | Line | Aug. 14, 1956 |
| 2,792,116 | Lenz et al. | May 14, 1957 |

FOREIGN PATENTS

| | | |
|---|---|---|
| 60,093 | France | Sept. 22, 1954 |
| 293,745 | Great Britain | Apr. 25, 1929 |
| 484,130 | Great Britain | May 2, 1938 |
| 773,490 | Great Britain | Apr. 24, 1957 |